United States Patent [19]
Yoshikawa et al.

[11] 3,872,221
[45] Mar. 18, 1975

[54] METHOD FOR PRODUCING ANHYDROUS SODIUM HYDROSULPHITE USING SODIUM FORMATE, FORMIC ACID OR FORMIC ACID ESTER

[75] Inventors: Yoshio Yoshikawa, Ushiku-Machi, Ibaraki-ken; Takeo Suzumori, Niijuku-Machi, Tokyo-fu, both of Japan

[73] Assignee: Mitsubishi Gas Chemical Co., Ltd., Tokyo, Japan

[22] Filed: Nov. 23, 1973

[21] Appl. No.: 418,452

[30] Foreign Application Priority Data
Nov. 28, 1972 Japan.............................. 47-118528

[52] U.S. Cl. .............................................. 423/515
[51] Int. Cl............................................ C01b 17/98
[58] Field of Search............................ 423/515, 516

[56] References Cited
UNITED STATES PATENTS

| | | | |
|---|---|---|---|
| 3,411,875 | 11/1968 | Yoshikawa et al. ................. | 423/515 |
| 3,576,598 | 3/1971 | Plentovich et al. ................. | 423/515 |
| 3,714,340 | 1/1973 | Fujiwara et al. .................... | 423/515 |

Primary Examiner—Earl C. Thomas
Attorney, Agent, or Firm—Brooks, Haidt & Haffner

[57] ABSTRACT

Anhydrous sodium hydrosulphite is produced by the reaction of sodium formate, formic acid or formic acid ester with sodium hydroxide and sulphur dioxide or sodium bisulphite in an aqueous solution of alcohol, under a reflux of formic acid ester which is boiled off from the reaction solution, wherein the improvement comprises the steps of adding sodium hydroxide to the formic acid ester which is condensed for reflux and returning the resulting mixture to the reaction solution.

2 Claims, 1 Drawing Figure

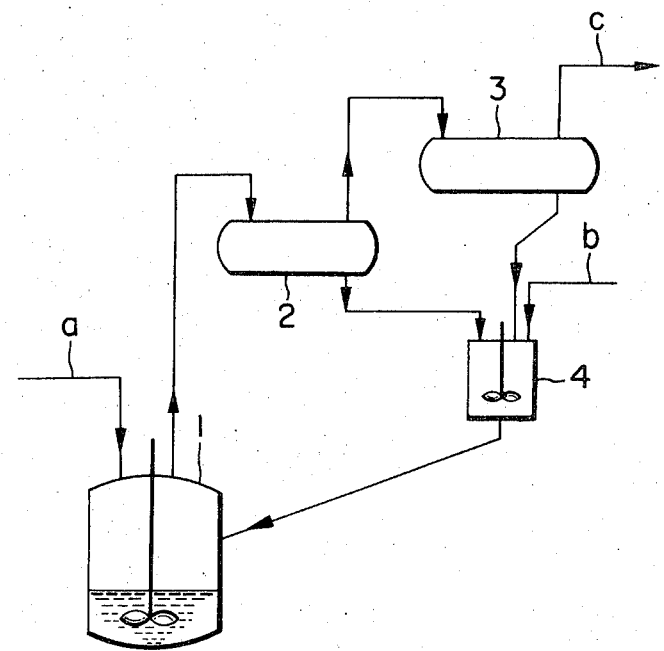

METHOD FOR PRODUCING ANHYDROUS SODIUM HYDROSULPHITE USING SODIUM FORMATE, FORMIC ACID OR FORMIC ACID ESTER

BACKGROUND OF THE INVENTION

1. Field of the Invention

The present invention relates to a method for producing anhydrous sodium hydrosulphite by the reaction of sodium formate, formic acid or formic acid ester with sodium hydroxide and sulphur dioxide or sodium bisulphite in an aqueous solution of alcohol.

2. Description of the Prior Art

As a commercial method for producing anhydrous sodium hydrosulphite by using sodium formate as starting material, there is known a method which comprises adding an aqueous sodium hydroxide solution and methanol containing sulphur dioxide while adjusting the pH of the reaction solution within an appropriate range. There has been also proposed a method for producing anhydrous sodium hydrosulphite from the above mentioned raw materials, in which a formic acid ester is produced as a by-product and the ester is boiled off from the reaction solution together with carbon dioxide produced as shown below, and thereby the yield is reduced.

$$HCOONa + 2SO_2 + NaOH \rightarrow Na_2S_2O_4 + CO_2 + H_2O$$

In such method, therefore, the formic acid ester is condensed by cooling it below its boiling point, preferably below 0° C in the case of methyl ester, and subsequently returned to the reaction solution.

SUMMARY OF THE INVENTION

According to the present invention, there is provided a method for producing anhydrous sodium hydrosulphite by the reaction of sodium formate, formic acid or formic acid ester with sodium hydroxide and sulphur dioxide or sodium bisulphite in an aqueous solution of alcohol under reflux of formic acid ester which is boiled off from the reaction solution, wherein the improvement comprises the steps of adding sodium hydroxide to the formic acid ester which is condensed for reflux and returning the resulting mixture to the reaction solution.

BRIEF DESCRIPTION OF THE DRAWING

The attached drawing shows a flow sheet of the present invention.

DESCRIPTION OF THE PREFERRED EMBODIMENTS

In our opinion the reaction of sodium hydrosulphite formation is considered to proceed as follows:

$$HCOONa + H_2O + SO_2 \rightarrow HCOOH + NaHSO_3 \quad (1)$$

$$NaOH + SO_2 \rightarrow NaHSO_3 \quad (2)$$

$$HCOOH + 2NaHSO_3 \xrightarrow{\text{Complex Decomposition}} Na_2S_2O_4 + 2H_2O + CO_2 \quad (3)$$

Sodium formate is a starting material for forming formic acid and sodium bisulphite as shown in formula (1). And the sodium formate which does not take part in the reaction serves as a buffer to stabilize the pH of the reaction solution to prevent the decomposition of the hydrosulphite produced. Therefore the concentration of sodium formate in the reaction solution should be kept sufficiently high to stabilize the pH of the reaction solution. The preferable pH of the reaction solution ranges from 4 to 6.

Formic acid formed by reaction (1) produces sodium hydrosulphite by reaction (3) and furthermore produces formic acid ester as by-product according to the following formula:

$$HCOOH + MeOH \rightarrow HCOOMe + H_2O \quad (4)$$

The formic acid ester thus formed has a low boiling point and is so volatile that it tends to be lost.

Consequently, there has been disclosed a method wherein the formic acid ester is condensed by cooling below its boiling point and is subsequently returned to the reaction solution to participate in the reaction as mentioned above. However, because most of the condensed formic acid ester is vaporized again before taking part in the reaction, the capacity of the vapour condenser should be designed inevitably to be large. In addition, it is difficult to utilize the formic acid ester sufficiently for the production of the sodium hydrosulphite.

According to the present invention, the condensed formic acid ester is once introduced into a small vessel; and a part of, or all of sodium hydroxide used in the reaction is introduced into the condensed formic acid ester, and the resulting mixture is allowed to react according to the equation as shown below, and returned to the reaction solution.

$$HCOOMe + NaOH \rightarrow HCOONa + MeOH \quad (5)$$

According to the above mentioned procedure of the present invention, the capacity of the vapour condenser can be reduced to from one third to a half of that in the conventional method, and moreover, the yield and the purity of the product are markedly improved. The refluxing liquid enters into the reactor in a form of sodium formate and methanol as the result of the reaction (5), and lowering of the concentration of sodium formate caused by formation of water according to the formula (3) can be avoided and furthermore the amount of sodium formate to be charged as raw material into the reactor can be reduced.

Reduction of the duty of the vapour condenser results in reduction of utilities such as steam, electricity, etc., and remarkable commercial advantage can be achieved.

In the case of using formic acid or formic acid ester as raw material, these materials may be added to the reaction solution at a rate corresponding to the rate of the production of the hydrosulphite, so as to maintain an optimum pH during the reaction.

Also in this case sodium formate can behave as a buffer in the reaction solution to facilitate control of the pH and therefore it is quite preferable that an appropriate amount of sodium formate be present in the initial reaction solution.

In the method of the present invention, the reaction may be effected at atmospheric or superatmospheric pressure.

The following examples are given for illustrating the present invention, and are by no means to be construed as limitation thereof.

EXAMPLE 1

Referring to the drawing, 80 parts of sodium formate, 40 parts of water and 120 parts of methanol were charged into the reactor 1 through conduit "a," and the resulting slurry was heated up to 74° C under atmospheric pressure. After the start of reflux, a solution in which 100 parts of sulphur dioxide was absorbed in 305 parts of methanol was uniformly added to the reactor 1 under stirring in 2 hours. The vapour containing formic acid ester was condensed by the water cooling condenser 2 and the vapour condenser 3 and the condensed liquid was led to the mixing vessel 4. The gas which was not condensed was exhausted through the duct "c." The condensed liquid was mixed and allowed to react with an aqueous sodium hydroxide solution introduced through conduit "b," and then returned to the reactor 1. The aqueous sodium hydroxide solution was prepared by dissolving 33 parts of sodium hydroxide in 45 parts of water and was uniformly added to the condensed liquid in 2 hours.

The reaction solution was kept at its boiling point under stirring for an additional 3 hours, and then cooled to 60° C.

The hydrosulphite produced was separated in the form of its anhydrous salt from the alcohol-water solution by filtration, washed with methanol and dried under vacuum. The yield of the final produce was 109 parts with a purity of 93.5 percent. The product was not powdery. The particle size distribution is shown in Table 1 below.

Table 1

| Particle size($\mu$) | >250 | 250–177 | 177–149 | 149–105 | 105–74 | 74–62 | <62 |
|---|---|---|---|---|---|---|---|
| Distribution (%) | 65 | 12 | 5 | 13 | 2 | 3 | 0 |

On the other hand, when the aqueous sodium hydroxide was not mixed with the condensed liquid and other procedures were conducted in a way similar to those as mentioned above, the yield of the final product was 100 parts with a purity of 91.5 percent.

EXAMPLE 2

73 parts of sodium formate, 45 parts of water and 110 parts of methanol were charged into the reactor 1. The resulting slurry was heated up to 77° C, and the reaction pressure was adjusted to 0.6Kg/cm$^2$ gauge. A solution in which 98.7 parts of sulphur dioxide was absorbed in 305 parts of methanol was added dropwise to the reactor 1 with stirring in 2 hours.

Simultaneously with addition of the methanol solution containing sulphur dioxide, the aqueous sodium hydroxide solution prepared by dissolving 37 parts of sodium hydroxide in 40 parts of water was charged dropwise through the mixing vessel 4 into the reactor 1 during 2 hours.

After completion of the addition of the methanol solution containing sulphur dioxide, the reaction temperature was kept at 82° C for 2 hours under a pressure of 1 Kg/cm$^2$ gauge so as to complete the reaction.

After the reaction was completed, the same treatment as described in Example 1 was carried out. The yield of the final product was 119 parts with a purity of 93.2 percent. The product is not powdery and its particle size distribution is shown in Table 2 below.

Table 2

| Particle sixe($\mu$) | >149 | 149–105 | 105–74 | 74–62 | <62 |
|---|---|---|---|---|---|
| Distribution (%) | 2 | 73 | 23 | 3 | 1 |

On the other hand, when the aqueous sodium hydroxide solution was directly added to the reactor 1, the yield of the final product was 112 parts with a purity of 92.5 percent.

EXAMPLE 3

80 parts of methanol and 35 parts of water were charged into the reactor 1. The resulting slurry was heated up to 82° C, and the reaction pressure was adjusted to 1 Kg/cm$^2$ gauge. The solution in which 100 parts of sulphur dioxide was absorbed in 305 parts of methanol was added dropwise to the reactor 1 under stirring in 2 hours.

Simultaneously with addition of the methanol solution containing sulphur dioxide, 76 parts of methyl formate and the aqueous sodium hydroxide solution prepared by dissolving 80 parts of sodium hdyroxide in 70 parts of water were dropwise charged uniformly through the mixing vessel 4 into the reactor during 80 minutes.

Methyl formate boiled off from the reaction solution was condensed and led to the mixing vessel.

After completion of the addition of the methanol solution containing sulphur dioxide, the reaction temperature was kept at 82° C for 2 hours under pressure of 1 Kg/cm$^2$ gauge so as to complete the reaction.

After the reaction was completed, the same treatment as described in Example 1 was carried out. The yield of the final product was 121 parts with a purity of 92.5 percent. The product is not powdery and its particle size distribution is shown in Table 3 below.

Table 3

| Particle size($\mu$) | >149 | 149–105 | 105–74 | 74–62 | <62 |
|---|---|---|---|---|---|
| Distribution (%) | 4 | 55 | 27 | 11 | 3 |

On the other hand, when the aqueous sodium hydroxide solution was directly added to the reactor 1, the yield of the final product was 109 parts with a purity of 91 percent.

We claim:

1. In a method for producing anhydrous sodium hydrosulphite by the reaction of sodium formate, formic acid or formic acid ester with sodium hydroxide and sulphur dioxide or sodium bisulphite in an aqueous solution of alcohol, under reflux of formic acid ester which is boiled off from the reaction solution, the improvement comprising the steps of adding sodium hydroxide to formic acid ester which is condensed for reflux and returning the resulting mixture to the reaction solution.

2. A method as claimed in claim 1, wherein the alcohol is methanol and the formic acid ester is methyl formate.

* * * * *